US012722488B2

(12) United States Patent
Komori et al.

(10) Patent No.: US 12,722,488 B2
(45) Date of Patent: Sep. 1, 2026

(54) VEHICLE

(71) Applicant: TOYOTA JIDOSHA KABUSHIKI KAISHA, Toyota (JP)

(72) Inventors: Keisuke Komori, Okazaki (JP); Hideki Tamoto, Toyota (JP); Yusuke Saigo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 18/938,861

(22) Filed: Nov. 6, 2024

(65) Prior Publication Data

US 2025/0153567 A1 May 15, 2025

(30) Foreign Application Priority Data

Nov. 15, 2023 (JP) ................................ 2023-194049

(51) Int. Cl.
*B60K 35/28* (2024.01)
*B60K 35/23* (2024.01)

(52) U.S. Cl.
CPC ............. *B60K 35/28* (2024.01); *B60K 35/23* (2024.01); *B60K 2360/119* (2024.01); *B60K 2360/166* (2024.01); *B60K 2360/171* (2024.01); *B60K 2360/1868* (2024.01)

(58) Field of Classification Search
CPC .. B60K 35/28; B60K 35/23; B60K 2360/119; B60K 2360/166; B60K 2360/171; B60K 2360/1868; B60K 2360/176; B60R 1/27; B60R 2300/105; B60R 2300/205; B60R 2300/301; B60R 2300/305; B60R 2300/802; B60R 2300/8093
See application file for complete search history.

(56) References Cited

U.S. PATENT DOCUMENTS 9,925,985 B2 * 3/2018 Freess .................. B60W 40/06
10,857,944 B2 * 12/2020 Nakasho ........... B62D 15/0295
10,878,253 B2 * 12/2020 Watanabe ................ B60R 1/06
2011/0199198 A1 * 8/2011 Yang ......................... B60R 1/24 340/426.25
2015/0353095 A1 * 12/2015 Freess .................. B60W 10/18 701/1
2017/0293814 A1 * 10/2017 Elie ...................... B60W 40/06
2019/0163988 A1 * 5/2019 Watanabe ................ B60R 1/06
2020/0031283 A1 * 1/2020 Nakasho ................. G08G 1/16
2022/0161718 A1 5/2022 Kida et al.

FOREIGN PATENT DOCUMENTS

JP 2005275691 A * 10/2005
JP 2022-082487 A 6/2022
WO WO-2013058049 A1 * 4/2013 ............. B60K 35/22
WO WO-2014050388 A1 * 4/2014 .......... B60W 40/064

* cited by examiner

*Primary Examiner* — Rufus C Point
(74) *Attorney, Agent, or Firm* — SoraIP, Inc.

(57) ABSTRACT

The vehicle includes a display (navigation screen and HUD) and a processor that causes the display to display panoramic images indicative of the surroundings of the vehicle, such that the vehicle is captured from above the vehicle. The panoramic image includes an icon that is superimposed on the panoramic image and indicates the positions of the plurality of wheels, and a recommended route that is superimposed on the panoramic image and indicates a route through which the plurality of wheels is desired to pass.

8 Claims, 5 Drawing Sheets

1
2
PANORAMIC VIEW CAMERA
3
ADAS
4
GROUND SURFACE SHAPE SENSOR
5
NAVIGATION SCREEN
6
HUD
7
ECU
71
PRC
72
MEM
8
DRIVE SYSTEM
81
BAT
82
PCU
83
MG
84

VEHICLE

CROSS-REFERENCE TO RELATED APPLICATION

This application claims priority to Japanese Patent Application No. 2023-194049 filed on Nov. 15, 2023, incorporated herein by reference in its entirety.

BACKGROUND

1. Technical Field

The present disclosure relates to a vehicle.

2. Description of Related Art

A peripheral image generation device disclosed in Japanese Unexamined Patent Application Publication No. 2022-82487 (JP 2022-82487 A) includes a composite image generation unit that generates a see-through underfloor image that is a composite image of a view through the bottom of a vehicle. The composite image generation unit is configured to superimpose a vehicle boundary line on an image showing part or all of a ground surface located below the vehicle as a see-through underfloor image, and generate an image with a predetermined pattern of decoration given to the vehicle boundary line. The vehicle boundary line indicates a boundary of a range in which a vehicle body is present.

SUMMARY

Depending on the type of vehicle, the vehicle is required to travel on a bad road (such as an off-road). Depending on a residential area of a driver, the vehicle may be forced to travel on a bad road (such as a snow-covered road). For such traveling conditions, it is desirable that the vehicle have high bad road traveling performance.

The present disclosure has been made to address the above issues, and an object of the present disclosure is to improve the bad road traveling performance of a vehicle.

(1) A vehicle according to an aspect of the present disclosure is configured to travel using a plurality of wheels. The vehicle includes a display and a processor configured to cause the display to display a panoramic image showing a situation around the vehicle in a manner that the vehicle is imaged from above the vehicle.

The panoramic image includes icons superimposed on the panoramic image and indicating positions of the wheels, and recommended routes superimposed on the panoramic image and indicating desired routes through which the wheels are expected to pass.

In the configuration (1), the icons indicating the positions of the wheels and the recommended routes are superimposed on the panoramic image. Thus, the driver can drive while checking the positional relationship between the positions of the wheels and the recommended routes. With the configuration (1), it is possible to improve the bad road traveling performance of the vehicle.

(2) The vehicle may further include a ground surface shape sensor configured to measure a shape of a ground surface on which the vehicle travels.

The processor may be configured to determine the recommended routes based on a measurement result from the ground surface shape sensor.

In the configuration (2), the recommended routes are determined based on the measurement result (that is, the shape of the ground surface) from the ground surface shape sensor. Even if, for example, some obstacle (including debris, rock, fallen wood, protrusions, holes, and grooves) are present on the ground surface, the vehicle can appropriately travel on a bad road while passing around the obstacles.

(3) The processor may be configured to determine the recommended routes to pass around an obstacle higher than a ground clearance of the vehicle and not to pass around an obstacle lower than the ground clearance.

In the configuration (3), the recommended routes are determined to pass around the obstacle higher than the ground clearance and not to pass around the obstacle lower than the ground clearance. Therefore, the range of route selection is extended while avoiding damage to the vehicle. Thus, the recommended routes can be secured more reliably.

(4) The panoramic image may further include a first icon and a second icon. The first icon may be superimposed on the panoramic image in a first display format and indicate the obstacle higher than the ground clearance.

The second icon may be superimposed on the panoramic image in a second display format different from the first display format and indicate the obstacle lower than the ground clearance.

In (4), determination is made as to whether the obstacle is higher or lower than the ground clearance of the vehicle. Therefore, the driver can drive while passing around the obstacle higher than the ground clearance of the vehicle more reliably or not passing around the obstacle lower than the ground clearance of the vehicle. Thus, the vehicle can appropriately travel on a bad road while passing around the obstacles more appropriately.

(5) The processor may be configured to determine the recommended routes to cause the wheels to pass along ruts in snow accumulated on the ground surface.

In the configuration (5), the recommended routes are determined to cause the wheels to pass along the ruts. This reduces the slip of the wheels (tires) compared to the case where the wheels do not pass along the ruts. With the configuration (5), the vehicle can appropriately travel on a bad road.

According to the present disclosure, it is possible to improve the bad road traveling performance of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
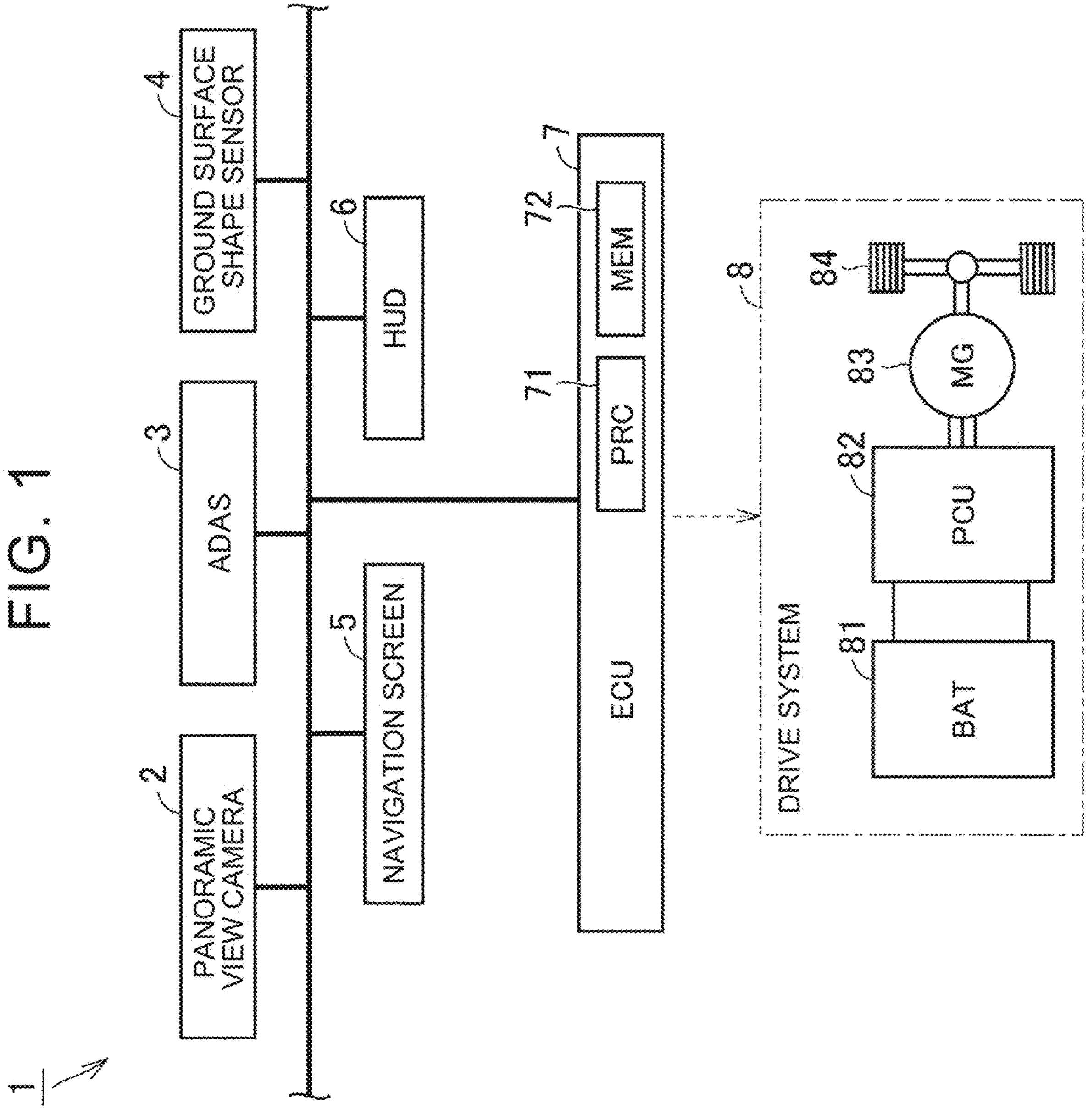
FIG. 1 is a diagram illustrating a vehicle configuration according to the present embodiment.

Hereinafter, embodiments of the present disclosure will be described in detail with reference to the drawings. It should be noted that the same or corresponding portions in the drawings are designated by the same reference signs and repetitive description will be omitted.

Embodiment

Vehicle Configuration

FIG. 1 is a diagram illustrating a vehicle configuration according to the present embodiment. The vehicle 1 includes a panoramic view camera 2, an advanced driving assistance system (ADAS) 3, a ground surface shape sensor 4, a navigation screen 5, a head-up display (HUD) 6, an electronic control unit (ECU) 7, and a drive system 8.

The panoramic view camera 2 includes, for example, a front camera, a rear camera, a left side camera, and a right side camera (neither of which is shown), and captures an image of the surroundings of the vehicle 1. With these images, a panoramic image indicating a situation around the vehicle 1 is generated as if the vehicle 1 was photographed from above the vehicle 1.

ADAS 3 is configured to assist the driver in driving the vehicle 1. Specifically, ADAS 3 may include functions such as an adaptive cruise control system (ACC), a forward collision warning (FCW), an advanced emergency braking system (AEBS), a lane departure warning (LDW), a lane keeping assist system (LKAS), etc.

The ground surface shape sensor 4 measures the shape (unevenness) of the ground surface on which the vehicle 1 travels. More specifically, the ground surface shape sensor 4 may be a light detection and ranging (LiDAR) sensor, a light section sensor using a light section method, or a stereo vision sensor using a stereo vision. The ground surface shape sensor 4 may be a combination of two or three of a LiDAR sensor, a light section sensor, and a stereo vision sensor.

The navigation screen 5 and HUD 6 show panoramic images. At least one of the navigation screen 5 and HUD 6 corresponds to a "display" according to the present disclosure.

ECU 7 includes a processor 71 and memories 72. The processor 71 may be read as a circuit (Circuitry) or a processing circuit (Processing Circuitry). ECU 7 generates a panoramic image to be displayed on the navigation screen 5 and HUD 6 based on a plurality of images captured by the panoramic view camera 2. The panoramic image will be described with reference to FIGS. 2 and 3. Further, ECU 7 executes a route recommendation process (described later in detail), and displays the route determined by the route recommendation process on the panoramic images. In addition, ECU 7 drives the vehicle 1 by controlling the drive system 8 in cooperation with ADAS 3. ECU 7 may be divided into a plurality of units for each function.

The drive system 8 includes a battery 81, a power control unit (PCU) 82, motor generator 83, and a plurality of wheels (tires) 84 as components for driving the vehicle 1. Although an example in which the vehicle 1 is a four-wheeled vehicle will be described in this example, the number of the wheels 84 is not particularly limited.

Since various situations in which the vehicle 1 travels on a rough road may occur, it is desirable that the vehicle 1 has a high rough road breaking property. Therefore, in the present embodiment, the vehicle 1 is configured to display a route in which traveling is desirable, more specifically, a route in which the unevenness of the ground surface is small, on the panoramic image.

Panoramic Images

ECU 7 has a "rubble road mode" and a "snow-covered road mode" as the driving modes of the vehicle 1. Both the rubble road mode and the snow-covered road mode are modes for allowing the four wheels 84 to pass through a route in which the unevenness of the ground surface is as small as possible and the traveling of the vehicle 1 is not hindered. As will be described below, ECU 7 determines a "recommended route" according to the driving mode, and superimposes various information including the recommended route on the panoramic image.

Rubble Road Mode

Figure 2:
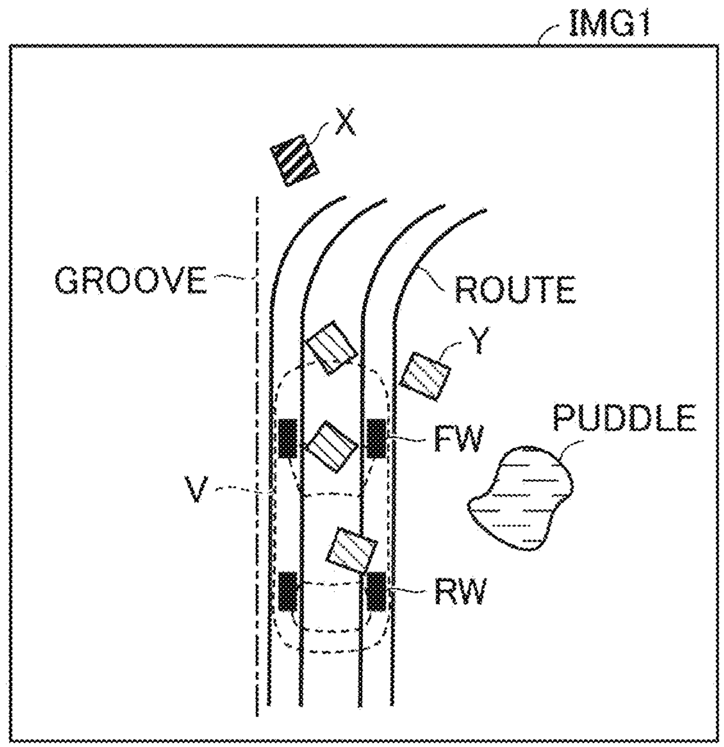
FIG. 2 is a diagram schematically illustrating an example of a panoramic image in a rubble road mode.

FIG. 2 is a diagram schematically illustrating an example of a panoramic image in a rubble road mode. The panoramic image IMG1 illustrated in FIG. 2 includes an icon indicating a vehicle body V (external shape) of the vehicle 1. In the present embodiment, an icon (two front wheels FW and two rear wheels RW) indicating the positions of the four wheels 84 is superimposed on the panoramic image IMG1.

In addition, the panoramic image IMG1 displays obstacle X, Y present on the ground surface and also displays recommended routes (shown in ROUTE) through which the four wheels 84 are desired to pass. The obstacle X is an object having a height equal to or higher than the ground clearance of the vehicle 1. The obstacle Y is an object having a height less than the ground clearance of the vehicle 1. When the vehicle 1 passes through the obstacle X, the vehicle body V (bumper, undercover, or the like) may come into contact with the obstacle X, while even if the vehicle 1 passes through the obstacle Y, the vehicle body V does not come into contact with the obstacle Y. Therefore, the recommended route is determined to avoid the obstacle X while the obstacle Y is not specifically avoided. Note that the icon of the obstacle X corresponds to the "first icon" according to the present disclosure, and the icon of the obstacle Y corresponds to the "second icon" according to the present disclosure.

In the panoramic image IMG1, a water pool (shown in PUDDLE) formed on the ground surface is also displayed. While it is difficult to estimate the depth of the water reservoir from the vehicle 1, the vehicle 1 may become inoperable when the wheels 84 fit into the deep water reservoir. Thus, the recommended route is determined such that the four wheels 84 do not pass through the water pool.

Further, when the road width is narrow, if the vehicle 1 travels in a groove (indicated by GROOVE) at the road end, the vehicle 1 may become out of wheels and unable to travel. Therefore, the recommended route is determined such that the four wheels 84 do not pass through the groove (or the vicinity thereof) at the road end.

Snow-Covered Road Mode

Figure 3:
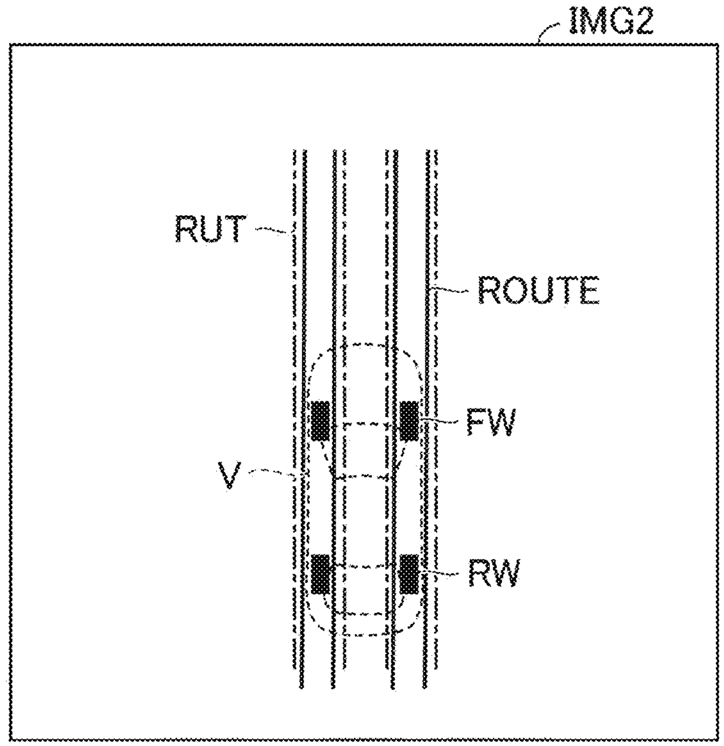
FIG. 3 is a diagram schematically illustrating an example of a panoramic image in a snow-covered road mode.

FIG. 3 is a diagram schematically illustrating an example of a panoramic image in the snow-covered road mode. Similarly to the rubble road mode, in the snow-covered road mode, an icon indicating the vehicle body V of the vehicle 1, an icon indicating the positions of the four wheels 84 (FW and RW), and a recommended route are superimposed on the panoramic image IMG2. The recommended route in the snow-covered road mode is determined such that four wheels 84 pass through a rut (shown in RUT) formed on the snow accumulated on the ground surface.

The panoramic image IMG1 of FIG. 2 and the panoramic image IMG2 of FIG. 3 are displayed on at least one of the navigation screen 5 and HUD 6. From the viewpoint of improving safety and reducing fatigue by reducing the viewpoint shift of the drivers, it is desirable that the panoramic image IMG1, IMG2 be displayed on HUD 6.

Route Recommendation Processing Flow

Figure 4:
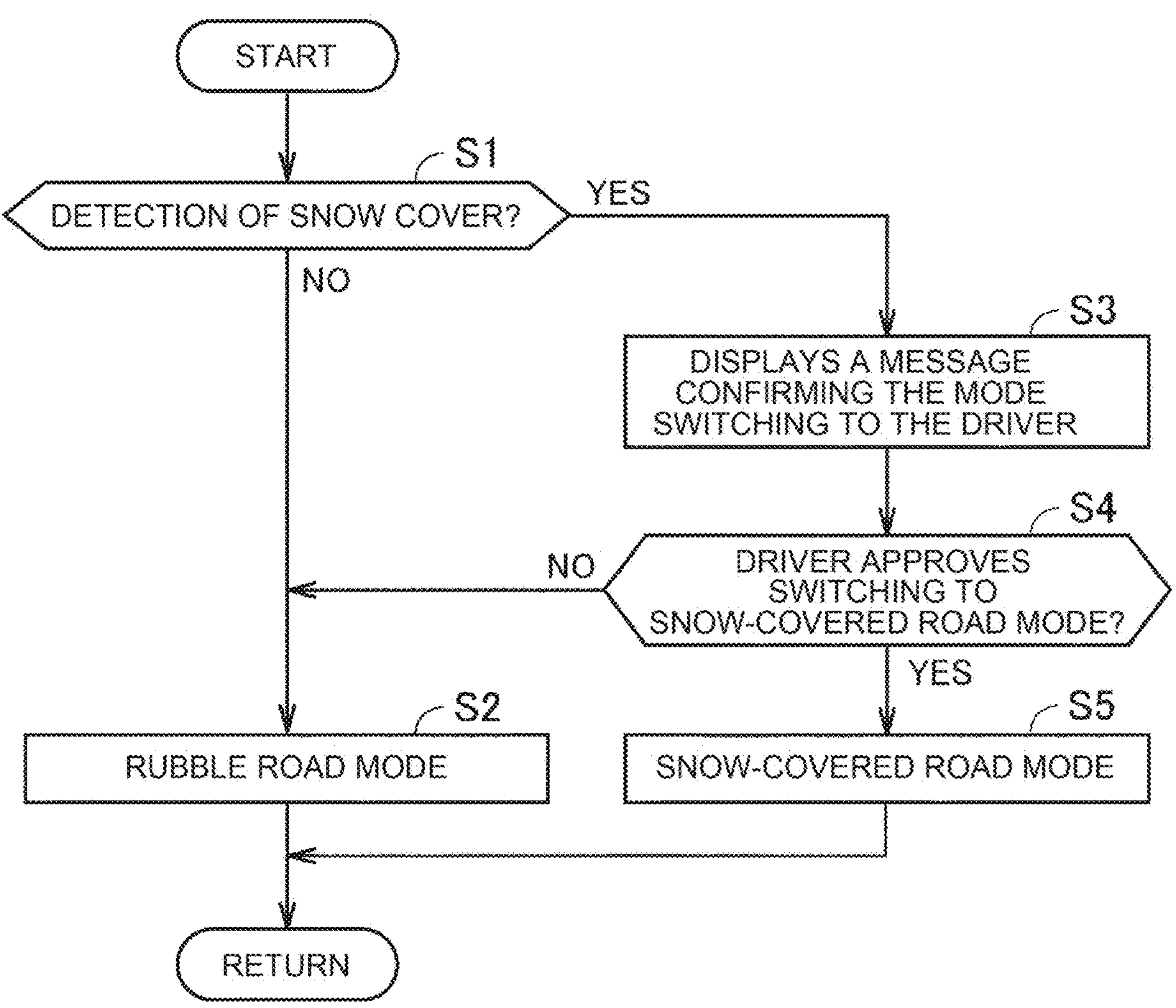
FIG. 4 is a flowchart illustrating a processing procedure related to mode switching in route recommendation processing.

FIG. 4 is a flowchart illustrating a processing procedure related to mode switching in route recommendation processing. The processing illustrated in this flowchart is executed when a predetermined condition is satisfied (for example, every predetermined cycle). The steps are realized by software-processing by an ECU 7, but may also be realized by hardware (electric circuitry) arranged in an ECU 7. Hereinafter, the term "step" is abbreviated as S. In this example, the rubble road mode is the default running mode.

In S1, ECU 7 determines whether a snow cover has been detected. ECU 7 can detect snow accumulation by, for example, determining whether or not a characteristic pattern (a color and shade of snow, a dent of a rut, and the like) of the ground surface covered with snow has been extracted in images captured by the panoramic view camera 2. This image processing (and other image processing described below) can be implemented using known image recognition techniques such as machine learning. If no snowfall is detected (NO in S1), ECU 7 maintains the default rubble road mode (S2).

When snow accumulation is detected (YES in S1), ECU 7 displays a message on the navigation screen 5 and/or HUD 6 to confirm whether or not the driving mode can be switched (S3). When the driver performs an operation of accepting the switching of the traveling mode (YES in S4), ECU 7 switches the traveling mode from the debris road mode to the snow-covered road mode (S5). If the driver performs an operation to reject the switching of the driving mode or does not perform any operation (NO in S4), ECU 7 maintains the driving mode in the rubble road mode (S2).

Although it is desirable to obtain the approval of the driver when switching the driving mode, ECU 7 may be configured to be capable of switching the driving mode without the approval of the driver. ECU 7 may be configured such that the driver can manually select the driving mode.

Rubble Road Mode

Figure 5:
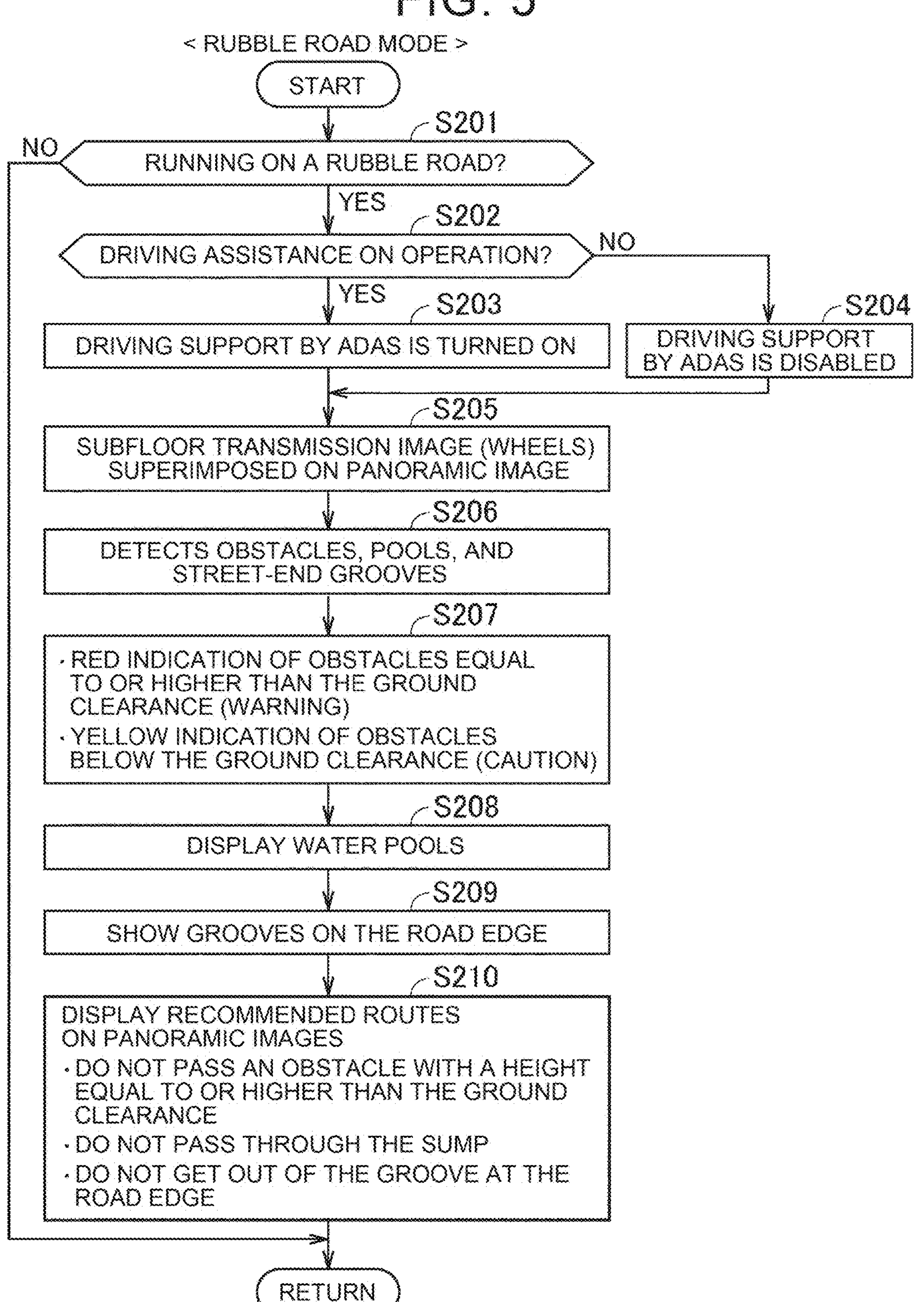
FIG. 5 is a flow chart showing a process sequence of a route recommendation process in the rubble road mode.

FIG. 5 is a flowchart illustrating a processing procedure of the route recommendation processing in the debris road mode. The processing illustrated in FIG. 5 and the flowchart of FIG. 6 to be described later is also repeatedly executed by being called from the main routine every time a predetermined condition is satisfied (typically, every predetermined cycle).

Referring to FIGS. 2 and 5, in S201, ECU 7 determines whether the vehicle 1 is traveling on a rubble road. ECU 7 may determine that the vehicle 1 is traveling on a rubble road when the unevenness of the ground surface is detected by the ground surface shape sensor 4. ECU 7 may determine that the vehicle 1 is traveling on the rubble road when small-scale vibrations characteristic of the rubble road are detected by the acceleration sensor (G sensor). When the vehicle 1 is not traveling on the rubble road (NO in S201), ECU 7 skips the subsequent processing and returns the processing to the main routine. When the vehicle 1 is traveling on a rubble road (YES in S201), ECU 7 proceeds the process to S202.

In S202, ECU 7 determines whether a driver-operation requesting driving assistance by ADAS 3 has been performed (whether ADAS 3 is switched on). If driving assistance is required (YES in S202), ECU 7 accepts assistance by ADAS 3 so that the four wheels 84 pass through the recommended route determined in the subsequent process (S203). ECU 7 limits the speed (vehicle speed) of the vehicle 1, displays a messaging prompting a deceleration, and assists the steering of the driver so that the four wheels 84 do not deviate from the recommended route, for example, based on the assistance of ADAS 3. If driving assistance is not requested (NO in S202), ECU 7 does not accept assistance by ADAS 3 (S204).

In S205, ECU 7 superimposes an under-floor transmission image including an icon indicating the positions of the four wheels 84 on the panoramic image. The icon is always kept displayed during the subsequent processing.

In S206, ECU 7 detects obstacles, pools, and street-end trenches around the vehicle 1 based on measurements by the panoramic view camera 2 and/or the ground surface shape sensor 4. Note that the obstacle can be detected by the panoramic view camera 2, LiDAR, the light section sensor, the stereo vision, or the like. The water pool may be detected by a panoramic view camera 2, a stereo vision, etc. The trenches at the street end can be detected by a panoramic view camera 2, a LiDAR, a light-cutting sensor, a stereo vision, etc.

In S207, ECU 7 superimposes an icon indicating the position and the shape of the obstacle X on the panoramic image so as to display the obstacle X having the height equal to or higher than the ground clearance of the vehicle 1 in a certain color (for example, red). ECU 7 superimposes an icon indicating the position and the shape of the obstacle Y on the panoramic image so as to display the obstacle Y having a height less than the ground clearance of the vehicle 1 in another color (for example, yellow). Since the ground clearance of the vehicle 1 is a known value for ECU 7, ECU 7 can determine whether the height of the obstacle is greater than or equal to the ground clearance or less than the ground clearance.

In S208, ECU 7, so as to display the water accumulation in a different color (e.g. light blue) from the above two colors, overlapping display the water accumulation of the icons on the panoramic image.

In S209, ECU 7 superimposes the shapes of the grooves of the road edges on the panoramic images so that the grooves of the road edges are displayed in colors (e.g., white) that differ from the above three colors.

In S210, ECU 7 determines a recommended route for the four wheels 84 so that the vehicle 1 (vehicle body) does not pass through an obstacle having a height equal to or higher than the ground clearance of the vehicle 1, and neither of the four wheels 84 passes through the water reservoir, and neither of the four wheels 84 gets out of the groove at the road end. Then, ECU 7 superimposes the determined recommended route on the panoramic images. ECU 7 then returns the process to the main routine. As a result, a series of processes is repeatedly executed.

Note that the obstacle, the water reservoir, the groove at the road end, and the recommended route remain superimposed on the panoramic image at the same time. Therefore, the order in which processes S207 to S210 are executed is not particularly limited.

Snow-Covered Road Mode

Figure 6:
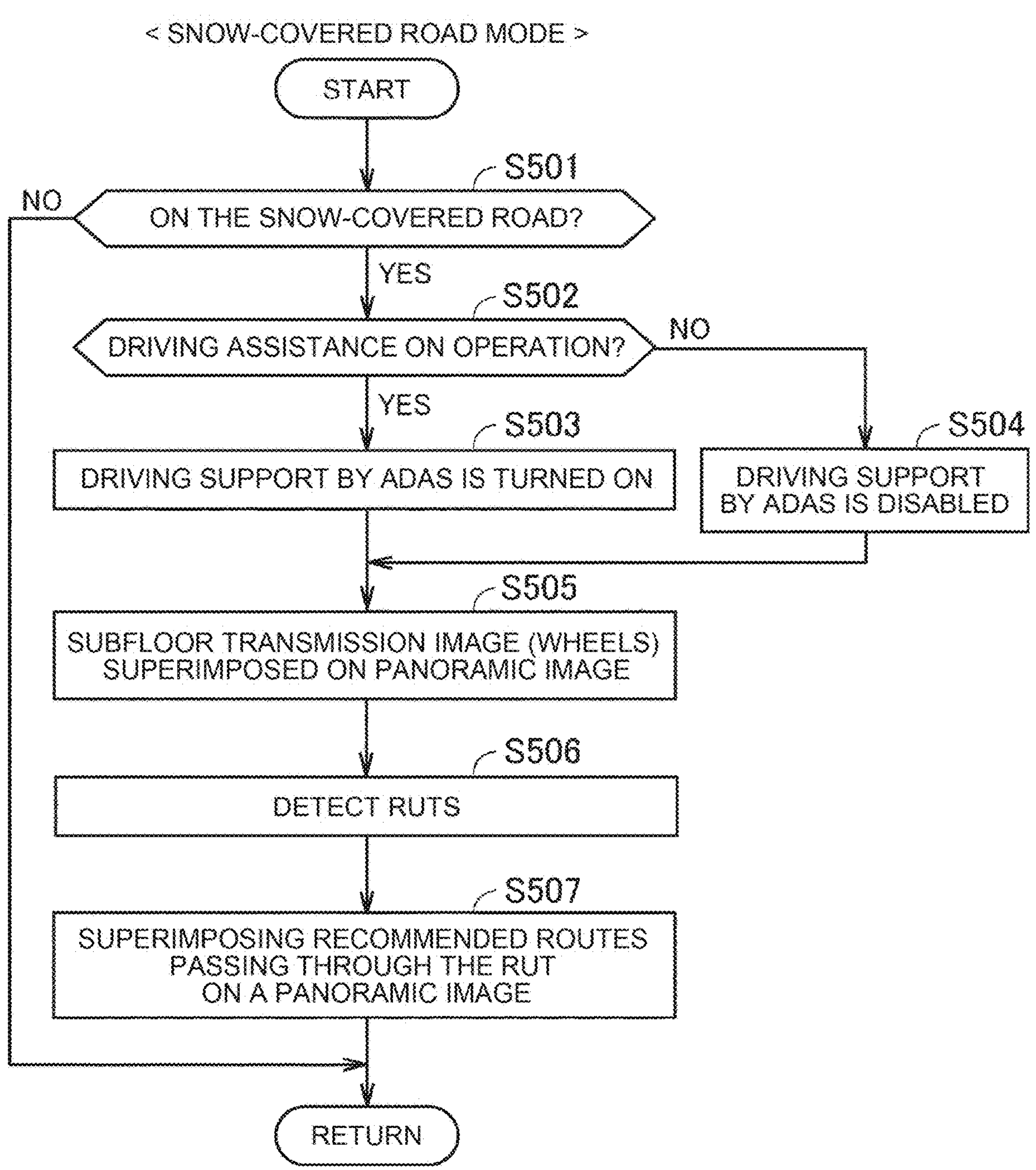
FIG. 6 is a flowchart illustrating a processing procedure of route recommendation processing in snow-covered road mode.

FIG. 6 is a flowchart illustrating a processing procedure of route recommendation processing in snow-covered road mode.

Referring to FIGS. 3 and 6, in S501, ECU 7 determines whether the vehicle 1 is traveling on a snow-covered road. As described above, ECU 7 can determine whether the vehicle 1 is traveling on a snow-covered road by determining whether snow is accumulated in images captured by the panoramic view camera 2. When the vehicle 1 is not traveling on the snow-covered road (NO in S501), ECU 7 skips the subsequent processing and returns the processing to the main routine. When the vehicle 1 is traveling on a snow-covered road (YES in S501), ECU 7 advances the process to S502.

The process related to ADAS 3 in S502 to S504 is equivalent to the corresponding process in the rubble road mode (see S204 to S202 of FIG. 5), and therefore will not be described again.

In S505, ECU 7 superimposes an under-floor transmission image including an icon indicating the positions of the four wheels 84 on the panoramic image.

In S506, ECU 7 detects a rut based on measurements made by the panoramic view camera 2 and/or the ground surface shape sensor 4. The rut can be detected based on a color difference (the rut is darker than the surrounding color) or a shadow (the shadow of the rut) in an image captured by the panoramic view camera 2. The rut can also be detected by unevenness (presence or absence of a depression) of the ground surface by the ground surface shape sensor 4.

In S507, ECU 7 determines the recommended route for the four wheels 84 so that all four wheels 84 pass through the rut. Then, ECU 7 superimposes the determined recommended route on the panoramic images.

As described above, in the present embodiment, the positions of the four wheels 84 are superimposed and displayed on the panoramic image, and the recommended route is superimposed and displayed on the panoramic image so that the four wheels 84 pass through a route with small ground surface irregularities. As a result, the driver can always check the positional relationship between the position of the wheels 84 and the recommended route, so that the vehicle 1 can preferably break through the rough road while avoiding obstacles (obstacles, water pools, grooves, etc.) existing on the ground surface. Therefore, according to the present embodiment, it is possible to improve the rough road breaking performance of the vehicle 1.

In addition, in the present embodiment, the obstacle X that is equal to or higher than the ground clearance is displayed in red, and the obstacle Y that is lower than the ground clearance is displayed in yellow. This is an example of a display mode in which the driver is displayed so as to be conspicuous as an obstacle or the like having a high degree of attention. However, a method of making some obstacles more conspicuous than other obstacles is not limited to being caused by a difference in color. For example, ECU 7 may control the navigation screen 5 and/or HUD 6 to display a particularly prominent obstacle with a thick solid line while displaying a less prominent obstacle with a thin line and/or a dotted line. Alternatively, ECU 7 may blink a particularly noticeable obstacle. ECU 7 may control a speaker (not shown) to emit a warning sound when the vehicle 1 approaches a particularly conspicuous obstacle.

In the present embodiment, it has been described that ECU 7 has two running modes (a rubble road mode and a snow-covered road mode). However, ECU 7 may have only one of the driving modes. Alternatively, without distinguishing between the driving modes by ECU 7, the icons indicating the positions of the four wheels 84 and the recommended routes may simply be superimposed on the panoramic images on the navigation screen 5 and/or HUD 6.

The embodiments disclosed herein are to be understood as being exemplary and not to be construed as being limitative of the present disclosure in every respect. It is intended that the scope of the disclosure be defined by the appended claims rather than the description of the embodiments described above, and that all changes within the meaning and range of equivalency of the claims be embraced therein.

What is claimed is:

1. A vehicle configured to travel using a plurality of wheels, the vehicle comprising:
- a display;
- a ground surface shape sensor configured to measure a shape of a ground surface on which the vehicle travels to determine whether snow has accumulated on the ground surface; and
- a processor configured to determine whether there are ruts in the accumulated snow extending substantially in a direction of travel of the vehicle, and determine the recommended routes to cause the wheels to pass along the ruts;
- the processor further configured to cause the display to display a panoramic image, wherein:
- the panoramic image shows a situation around and under the vehicle in a manner that the vehicle is imaged from above the vehicle;
- the panoramic image includes wheel icons and the recommended routes;
- the wheel icons are superimposed on the panoramic image and indicate current positions and current unevenness of the wheels;
- the recommended routes are superimposed on the panoramic image and indicate desired routes through which the wheels are expected to pass; and
- the processor is further configured to determine the recommended routes based on a measurement result from the ground surface shape sensor.

2. The vehicle according to claim 1, wherein the processor is configured to determine the recommended routes to pass around an obstacle higher than a ground clearance of the vehicle and not to pass around an obstacle lower than the ground clearance.

3. The vehicle according to claim 2, wherein:
- the panoramic image further includes a first icon and a second icon;
- the first icon is superimposed on the panoramic image in a first display format and indicating-indicates the obstacle higher than the ground clearance; and
- the second icon is superimposed on the panoramic image in a second display format different from the first display format and indicating-indicates the obstacle lower than the ground clearance.

4. The vehicle according to claim 1, wherein the panoramic image also shows a situation under the vehicle in the manner that the vehicle is imaged from above.

5. The vehicle according to claim 1, wherein:
- the processor is configured to determine a road obstacle based on the measurement result from the ground surface shape sensor;
- the panoramic image further includes an obstacle icon representing the road obstacle; and
- the obstacle icon in the panoramic image is located between the wheel icons.

6. The vehicle according to claim 3, wherein:
- the panoramic image further includes a third icon;
- the third icon is superimposed on the panoramic image in a third display format different from the first display format and the second display format and indicates a pool of liquid; and
- the processor is further configured to determine the recommended routes to pass around the pool of liquid.

7. A vehicle configured to travel using a plurality of wheels, the vehicle comprising:

a display; and a processor configured to:

cause the display to display a panoramic image;

determine whether snow has accumulated on the ground; and determine whether there are ruts in the accumulated snow extending substantially in a direction of travel of the vehicle, wherein:

the panoramic image shows a situation around the vehicle in a manner that the vehicle is imaged from above the vehicle;

the panoramic image includes wheel icons and recommended routes;

the wheel icons are superimposed on the panoramic image and indicate positions of the wheels;

the recommended routes is superimposed on the panoramic image and indicates desired routes through which the wheels are expected to pass; and the processor is further configured to determine the recommended routes to cause the wheels to pass along the ruts in the accumulated snow.

8. The vehicle according to claim 7, wherein:

the panoramic image further includes rut icons representing the ruts in the accumulated snow;

the panoramic image further includes a raised surface icon representing a mound of snow formed between the rut icons; and a portion of the raised surface icon the panoramic image is located between the wheel icons.

* * * * *